United States Patent
Saarikko

(10) Patent No.: US 10,228,565 B1
(45) Date of Patent: Mar. 12, 2019

(54) VARIABLE FOCUS WAVEGUIDE DISPLAY

(71) Applicant: Facebook Technologies, LLC, Menlo Park, CA (US)

(72) Inventor: Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/495,373

(22) Filed: Apr. 24, 2017

Related U.S. Application Data

(60) Provisional application No. 62/342,759, filed on May 27, 2016.

(51) Int. Cl.
 *G02B 26/08* (2006.01)
 *G02B 27/01* (2006.01)
 *G02B 27/00* (2006.01)
 *F21V 8/00* (2006.01)
 *H04N 9/31* (2006.01)
 *G02B 26/10* (2006.01)

(52) U.S. Cl.
 CPC ....... *G02B 27/0172* (2013.01); *G02B 6/0036* (2013.01); *G02B 26/101* (2013.01); *G02B 26/103* (2013.01); *G02B 27/0081* (2013.01); *G02B 27/0176* (2013.01); *H04N 9/317* (2013.01); *H04N 9/3129* (2013.01); *H04N 9/3155* (2013.01); *G02B 2027/013* (2013.01); *G02B 2027/0123* (2013.01); *G02B 2027/0125* (2013.01); *G02B 2027/0147* (2013.01); *G02B 2027/0159* (2013.01); *G02B 2027/0178* (2013.01)

(58) Field of Classification Search
 CPC ...... G02B 2027/0123; G02B 2027/011; G02B 2027/0132; G02B 2027/0178; G02B 27/0172; G02B 5/1842; H04N 9/3129; H04N 9/3155; H04N 9/317
 USPC ...................................................... 359/212.1
 See application file for complete search history.

(56) References Cited

U.S. PATENT DOCUMENTS

2015/0260994 A1* 9/2015 Akutsu .............. G02B 27/0172 385/37

* cited by examiner

*Primary Examiner* — Euncha P Cherry
(74) *Attorney, Agent, or Firm* — Fenwick & West LLP

(57) ABSTRACT

A waveguide display presents media to users. The waveguide assembly includes a light source, a source waveguide, an output waveguide, an actuator assembly, and a controller. The light source emits image light based on scanning instructions from the controller. The source waveguide receives the emitted image light, expands the image light in at least one dimension, and outputs an expanded image light to the output waveguide at an input area. The output waveguide outputs the expanded image light from a portion of an output area. The actuator assembly adjusts a first curvature of the source waveguide with a first set of actuators and adjusts a second curvature of the output waveguide with a second set of actuators, where the first curvature is orthogonal to the first curvature.

20 Claims, 11 Drawing Sheets

US 10,228,565 B1

VARIABLE FOCUS WAVEGUIDE DISPLAY

CROSS REFERENCE TO RELATED APPLICATIONS

This application claims the benefit of U.S. Provisional Application No. 62/342,759, filed on May 27, 2016, which is incorporated by reference in its entirety.

BACKGROUND

The disclosure relates generally to near-eye-display systems, and more specifically to scanning waveguide displays.

Near-eye light field displays project images directly into a user's eye, encompassing both near-eye displays (NEDs) and electronic viewfinders. Conventional near-eye displays (NEDs) generally have a display element that generates image light that passes through one or more lenses before reaching the user's eyes. Additionally, NEDs in virtual reality systems and/or augmented reality systems are typically required to be compact and light weight, and to provide large exit pupil for ease of use. However, designing a conventional NED to have a large exit pupil can result in rather large lenses, and a relatively bulky and heavy NED.

SUMMARY

A waveguide display is used for presenting media to a user. In some embodiments, the waveguide display is incorporated into, e.g., a near-eye-display (NED) as part of a virtual reality (VR), augmented reality (AR), mixed reality (MR), or some combination thereof, system. The waveguide display includes a scanning waveguide assembly and an output waveguide. The scanning waveguide assembly includes a light source, a source waveguide, an output waveguide, an actuator assembly, and a controller. Light from the source is coupled into the source waveguide which emits the image light at specific locations along the source waveguide. The emitted image light is coupled into the output waveguide at an entrance location. The output waveguide outputs the image light at a location offset from the entrance locations.

In some embodiments, portions of the scanning waveguide assembly are coupled to one or more actuators. The actuators cause the source waveguide within the scanning waveguide assembly to bend, thereby generating curvature in the source waveguide. The curvature causes the emitted image light to converge in one dimension (e.g., similar to a cylindrical lens). Accordingly, the actuators are able to vary a first focal dimension (i.e., a single dimension is focused) of the source waveguide. The controller determines an amount of actuation to occur based on a desired focus position for the first focal dimension.

In some embodiments, the output waveguide is coupled to one or more actuators. The one or more actuators cause the output waveguide to bend, thereby generating curvature in the output waveguide. The curvature causes the emitted image light to converge in one dimension, and the amount of bend introduced by the one or more actuators is controlled by the controller. In some embodiments, the one or more actuators are positioned to bend the output waveguide in a direction orthogonal to a bend introduced into the source waveguide. The actuators are able to vary a focal dimension (i.e., a single dimension is focused) of output waveguide, and in some instances, this focal dimension may be orthogonal to (or different from) the first focal dimension. Accordingly, the controller is able to vary a focus position of the waveguide display, by adjusting curvature of the source waveguide such that image light focuses at a desired location in the first focal dimension, and adjusting curvature of the output waveguide such that the image light also focuses at the desired location in the second focal dimension that is orthogonal to the first focal dimension.

In some embodiments, the waveguide display includes a light source, a source waveguide, an output waveguide, an actuator assembly, and a controller. The light source emits a monochromatic image light based on scanning instructions from the controller. The source waveguide receives the image light in at least one dimension at an entrance area and outputs an expanded image light from an exit area. The source waveguide includes the first entrance area and the first exit area along a planar surface on the source waveguide. The output waveguide receives the expanded image light emitted from the source waveguide at an input area and outputs the expanded image light from a portion of an output area. The actuator assembly includes a first set of actuators and a second set of actuators. The actuator assembly causes the source waveguide to bow in a first direction with the first set of actuators and causes the output waveguide to bow in a second direction with the second set of actuators. In some configurations, the second direction is orthogonal to the first direction. The controller generates and provides the scanning instructions to at least one of the light source and the source assembly.

Figure 1:
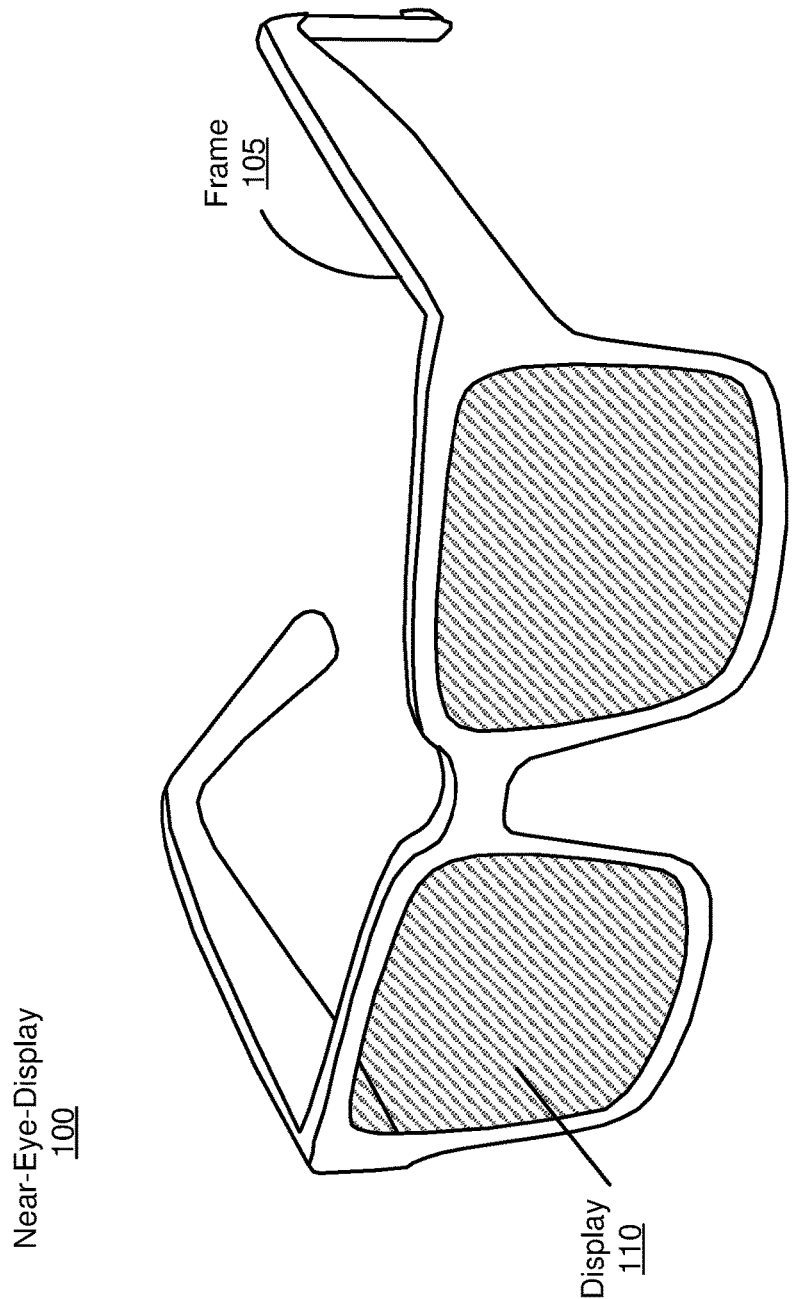
FIG. 1 is a diagram of a NED, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A varifocal waveguide display is a display that can adjust a focal position of image light emitted from the waveguide display. In some embodiments, the waveguide display is incorporated into, e.g., a near-eye-display (NED) as part of a virtual reality (VR), augmented reality (AR), mixed reality (MR), or some combination thereof, system. The waveguide display includes a scanning waveguide assembly and an output waveguide. The scanning waveguide assembly includes a light source, a source waveguide, and a scanning apparatus, and a controller. Light from the source is coupled into the source waveguide which emits the image light at specific locations along the waveguide. The emitted image light is coupled into the output waveguide at an entrance location. The output waveguide outputs the image light at a location offset from the entrance location, and the location/direction of the emitted image light is based in part on the orientation of the scanning apparatus. The orientation of the scanning apparatus is determined by the controller.

In some embodiments, portions of the scanning waveguide assembly are coupled to one or more actuators. The actuators cause a source waveguide within the scanning waveguide assembly to bend, thereby generating curvature in the source waveguide. The curvature causes the emitted image light to converge in one dimension (e.g., similar to a cylindrical lens). For example, assuming a Cartesian coordinate system, the curvature may be such that as the image light propagates along Z it converges in X, but not Y. Accordingly, the actuators are able to vary a first focal dimension (i.e., a single dimension is focused) of source waveguide. The controller determines an amount of actuation to occur based on a desired focus position for the first focal dimension.

In some embodiments, the output waveguide is coupled to one or more actuators. The one or more actuators cause the output waveguide to bend, thereby generating curvature in the output waveguide. The curvature causes the emitted image light to converge in one dimension, and the amount of bend introduced by the one or more actuators is controlled by the controller. In some embodiments, the one or more actuators are positioned to bend the output waveguide in a direction orthogonal to a bend introduced into the source waveguide. The actuators are able to vary a focal dimension (i.e., a single dimension is focused) of output waveguide, and in some instances, this focal dimension may be orthogonal to (or different from) the first focal dimension. Accordingly, the controller is able to vary a focus position of the waveguide display, by adjusting curvature of the source waveguide such that image light focuses at a desired location in the first focal dimension, and adjusting curvature of the output waveguide such that the image light also focuses at the desired location in the second focal dimension that is orthogonal to the first focal dimension.

FIG. 1 is a diagram of a near-eye-display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 is coupled to one or more optical elements which together display media to users. In some embodiments, the frame 105 may represent a frame of eye-wear glasses. The display 110 is configured for users to see the content presented by the NED 100. As discussed below in conjunction with FIG. 2, the display 110 includes at least one waveguide display assembly (not shown) for directing one or more image light to an eye of the user. The waveguide display assembly includes, e.g., a waveguide display, a stacked waveguide display, a varifocal waveguide display, or some combination thereof. The stacked waveguide display is a polychromatic display created by stacking waveguide displays whose respective monochromatic sources are of different colors. The varifocal waveguide display is a display that can adjust a focal position of image light emitted from the waveguide display.

Figure 2:
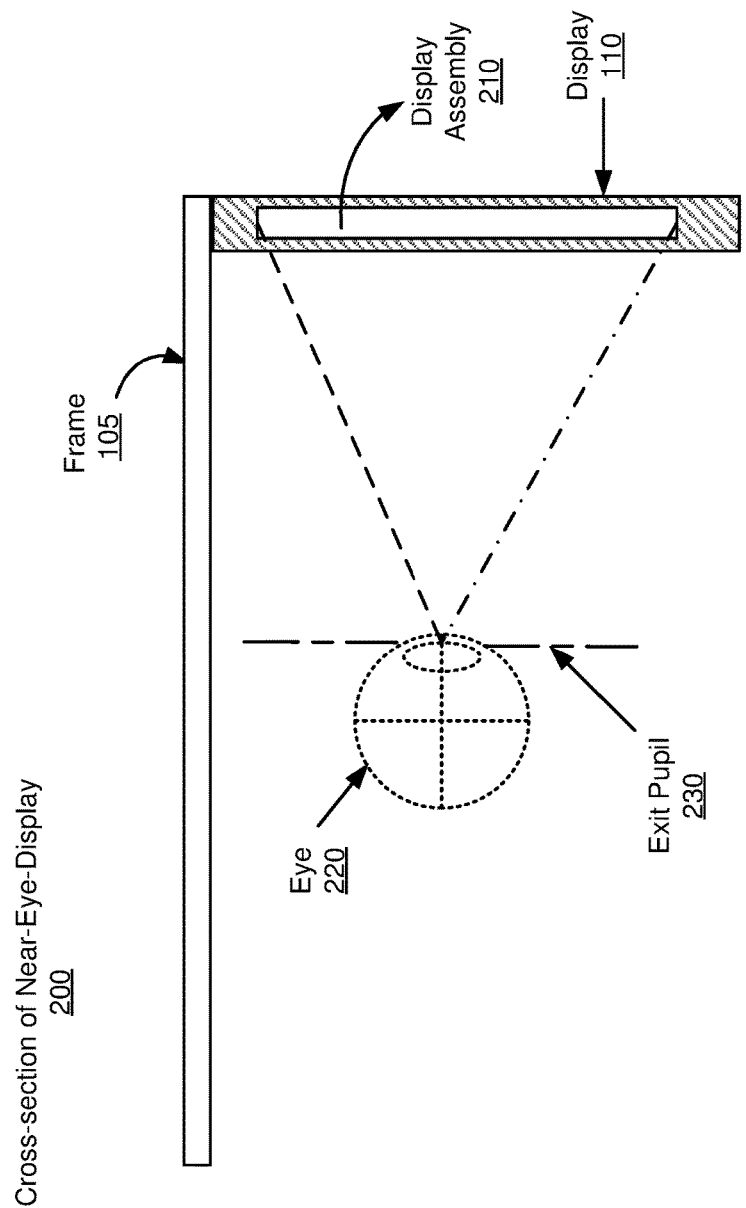
FIG. 2 is a cross-section of the NED illustrated in FIG. 1, in accordance with an embodiment.

FIG. 2 is a cross-section 200 of the NED 100 illustrated in FIG. 1, in accordance with an embodiment. The display 110 includes at least one display assembly 210. An exit pupil 230 is a location where the eye 220 is positioned when the user wears the NED 100. For purposes of illustration, FIG. 2 shows the cross section 200 associated with a single eye 220 and a single display assembly 210, but in alternative embodiments not shown, another waveguide display assembly which is separate from the waveguide display assembly 210 shown in FIG. 2, provides image light to another eye 220 of the user.

The display assembly 210, as illustrated below in FIG. 2, is configured to direct the image light to the eye 220 through the exit pupil 230. The display assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the display assembly 210 and the eye 220. The optical elements may act to, e.g., correct aberrations in image light emitted from the display assembly 210, magnify image light emitted from the display assembly 210, some other optical adjustment of image light emitted from the display assembly 210, or some combination thereof. The example for optical elements may include an aperture, a Fresnel lens, a convex lens, a concave lens, a filter, or any other suitable optical element that affects image light.

In some embodiments, the display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. A varifocal waveguide display is a display that can adjust a focal position of image light emitted from the waveguide display. In alternate embodiments, the display assembly 210 may include a stacked waveguide display and a varifocal waveguide display.

Figure 3A:
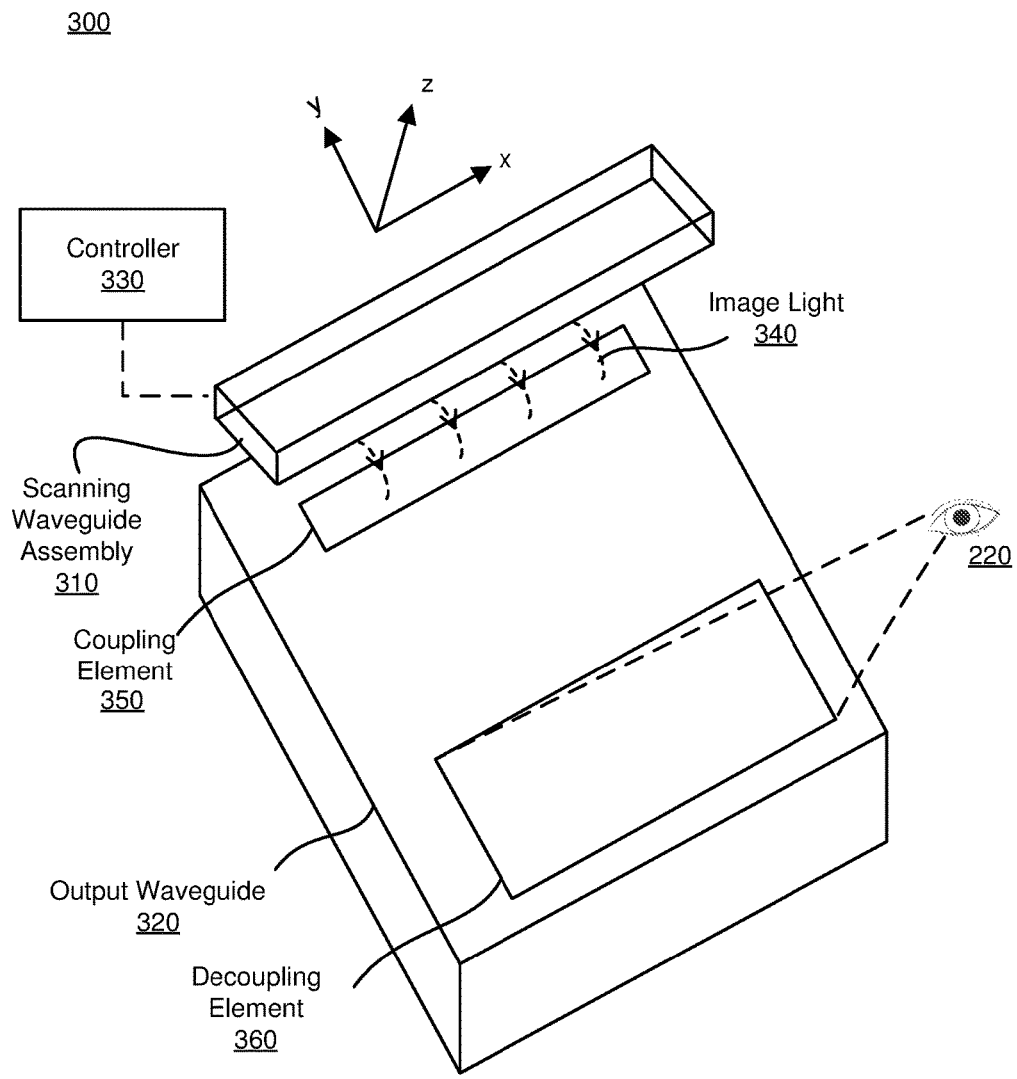
FIG. 3A illustrates an isometric view of a waveguide display, in accordance with an embodiment.

FIG. 3A illustrates an isometric view of a waveguide display 300, in accordance with an embodiment. In some embodiments, the waveguide display 300 (may also be referred to as a scanning waveguide display) is a component (e.g., display assembly 210) of the NED 100. In alternate embodiments, the waveguide display 300 is part of some other NED, or other system that directs display image light to a particular location.

The waveguide display 300 includes at least a scanning waveguide assembly 310, an output waveguide 320, and a controller 330. For purposes of illustration, FIG. 3A shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The scanning waveguide assembly 310 generates image light. The scanning waveguide assembly 310 includes an optical source, a source waveguide, and a scanning apparatus (e.g., as further described below with regard to FIG. 4). The scanning waveguide assembly 310 generates and outputs image light 340 to a coupling element 350 of the output waveguide 320.

The output waveguide 320 is an optical waveguide that outputs image light to an eye 220 of a user. The output waveguide 320 receives the image light 340 at one or more coupling elements 350, and guides the received input image light to one or more decoupling elements 360. In some embodiments, the coupling element 350 couples the image light 340 from the scanning waveguide assembly 310 into the output waveguide 320. The coupling element 350 may be, e.g., a diffraction grating, a holographic grating, a holographic reflector, a set of reflective surfaces embedded into the output waveguide 320, and one or more prismatic reflectors, some other element that couples the image light 340 into the output waveguide 320, or some combination thereof. For example, in embodiments where the coupling element 350 is diffraction grating, the pitch of the diffraction grating is chosen such that total internal reflection occurs, and the image light 340 propagates internally toward the decoupling element 360. For example, the pitch of the diffraction grating may be in the range of 300 nm to 600 nm.

The decoupling element 360 decouples the total internally reflected image light from the output waveguide 320. The decoupling element 360 may be, e.g., a diffraction grating, a holographic grating, a holographic reflector, a set of reflective surfaces embedded into the output waveguide 320, and one or more prismatic reflectors, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. An orientation and position of the image light exiting from the output waveguide 320 is controlled by changing an orientation and position of the image light 340 entering the coupling element 350. For example, the pitch of the diffraction grating may be in the range of 300 nm to 600 nm.

The output waveguide 320 may be composed of one or more materials that facilitate total internal reflection of the image light 340. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 controls the scanning operations of the scanning waveguide assembly 310. The controller 330 determines scanning instructions for the scanning waveguide assembly 310 based at least on the one or more display instructions. Display instructions are instructions to render one or more images. In some embodiments, display instructions may simply be an image file (e.g., bitmap). The display instructions may be received from, e.g., a console of a VR system (e.g., as described below in conjunction with FIG. 9). Scanning instructions are instructions used by the scanning waveguide assembly 310 to generate image light 340. The scanning instructions may include, e.g., a type of a source of image light (e.g. monochromatic, polychromatic), a scanning rate, an orientation of a scanning apparatus, one or more illumination parameters (described below with reference to FIG. 4), one or more control signals that determine an operation of one or more actuators coupled to one or more waveguides (as described in detail below with regard to FIGS. 7 and 8), or some combination thereof. The controller 330 includes a combination of hardware, software, and/or firmware not shown here so as not to obscure other aspects of the disclosure.

Figure 3B:
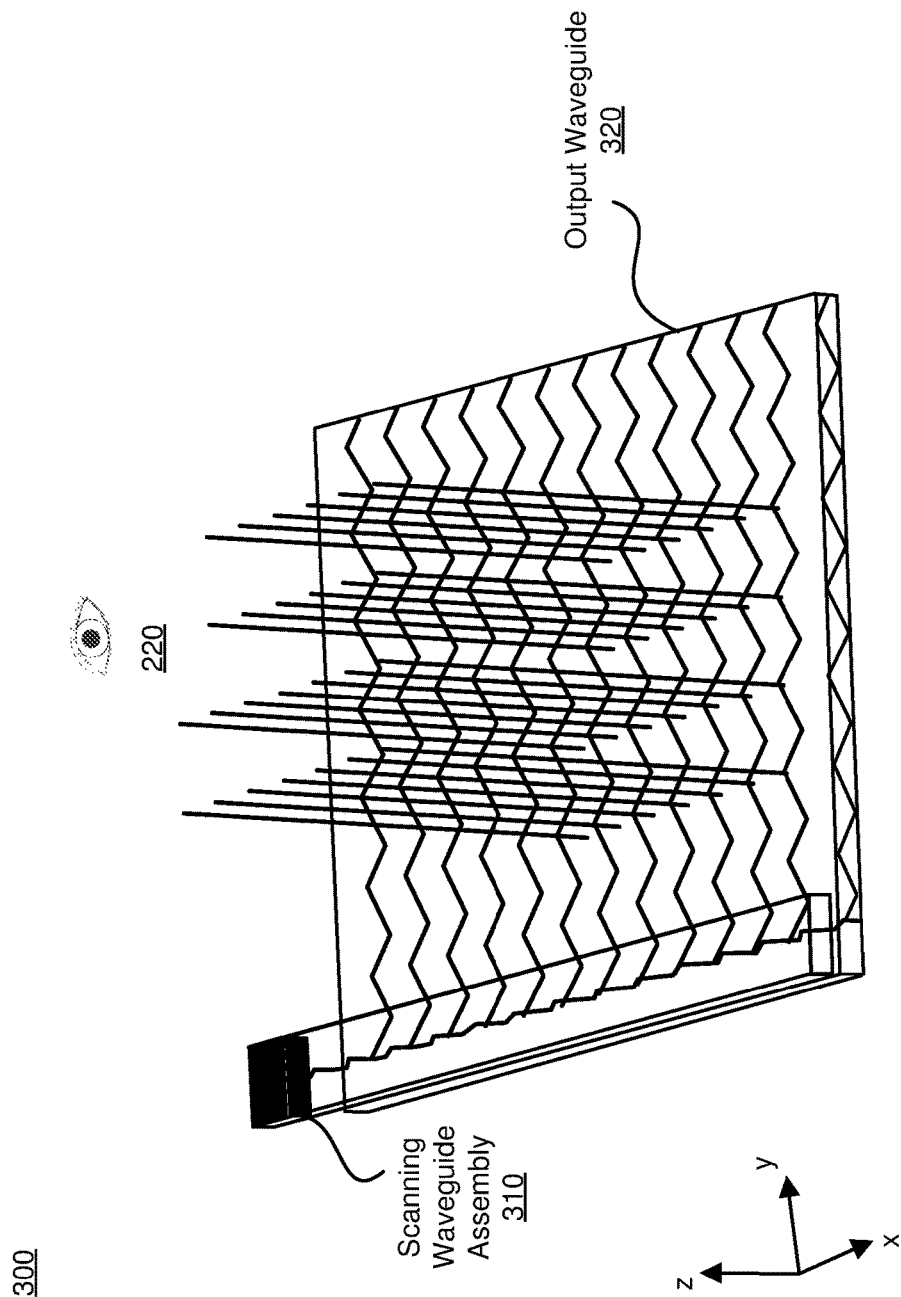
FIG. 3B illustrates a tilted view of a waveguide display, in accordance with an embodiment.

FIG. 3B illustrates a tilted view of the waveguide display 300, in accordance with an embodiment. FIG. 3B is only an alternate embodiment of the waveguide display 300 of FIG. 3A, and all the details described above with reference to FIG. 3A applies to FIG. 3B as well. FIG. 3B illustrates the propagation of one or more image light through the scanning waveguide assembly 310 and the output waveguide 320. The scanning waveguide assembly 310 generates and outputs image light 340 to the coupling element 350 of the output waveguide 320. The image light 340 undergoes total internal reflection at the output waveguide 320 as illustrated in FIG. 3B. The total internally reflected image light from the output waveguide 320 decouples through the decoupling element 360 and reaches the eye 220.

Figure 4:
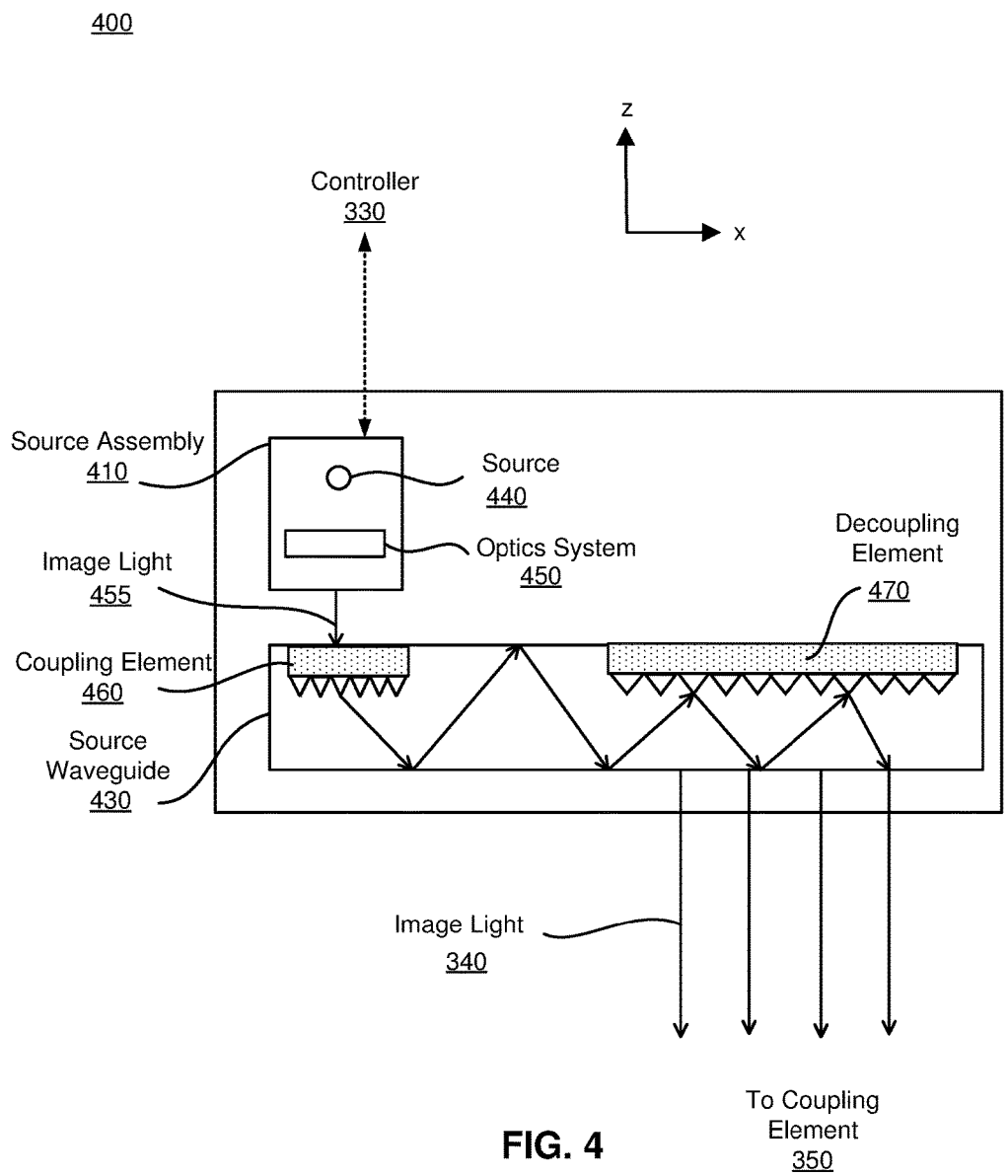
FIG. 4 illustrates a cross-section of a scanning waveguide display, in accordance with an embodiment.

FIG. 4 illustrates a cross-section 400 of the scanning waveguide assembly 300, in accordance with an embodiment. The cross-section 400 of the scanning waveguide assembly 300 includes at least a source assembly 410 and a source waveguide 430.

The source assembly 410 generates light in accordance with scanning instructions from the controller 330. The source assembly 410 includes a source 440, and an optics system 450. The source 440 is a source of light that generates at least a coherent or partially coherent image light. The source 440 may be, e.g., laser diode, a vertical cavity surface emitting laser, a light emitting diode, a tunable laser, or some other light source that emits coherent or partially coherent light. The source 440 emits light in a visible band (e.g., from about 390 nm to 700 nm), and it may emit light that is continuous or pulsed. In some embodiments, the source 440 may be a laser that emits light at a particular wavelength (e.g., 532 nanometers). The source 440 emits light in accordance with one or more illumination parameters received from the controller 330. An illumination parameter is an instruction used by the source 440 to generate light. An illumination parameter may include, e.g., source wavelength, pulse rate, pulse amplitude, beam type (continuous or pulsed), other parameter(s) that affect the emitted light, or some combination thereof.

The optics system 450 includes one or more optical components that condition the light from the source 440. Conditioning light from the source 440 may include, e.g., expanding, collimating, adjusting orientation in accordance with instructions from the controller 330, some other adjustment of the light, or some combination thereof. The one or more optical components may include, e.g., lenses, mirrors, apertures, gratings, or some combination thereof. Light emitted from the optics system 450 (and also the source assembly 410) is referred to as image light 455. The optics system 450 outputs the image light 455 at a particular orientation (in accordance with the scanning instructions) toward the source waveguide 430.

The source waveguide 430 is an optical waveguide. The source waveguide 430 may be composed of one or more materials that facilitate total internal reflection of the image light 455. The source waveguide 430 may be composed of e.g., silicon, plastic, glass, or polymers, a material with an index of refraction between X and Z, or some combination thereof. The source waveguide 430 has a relatively small form factor. For example, the source waveguide 430 may be approximately 50 mm long along X-dimension, 3 mm wide along Y-dimension, and 0.5-1 mm thick along Z-dimension.

The source waveguide 430 includes a coupling element 460 and a decoupling element 470. The source waveguide 430 receives the image light 455 emitted from the source assembly 410 at the coupling element 460. The coupling element 460 couples the image light 455 from the source assembly 410 into the source waveguide 430. The coupling element 460 may be, e.g., a diffraction grating, a holographic grating, a holographic reflector, a set of reflective surfaces embedded into the source waveguide 430, one or more prismatic reflectors, some other element that couples the image light 455 into the source waveguide 430, or some combination thereof. For example, in embodiments where the coupling element 460 is diffraction grating, the pitch of the diffraction grating is chosen such that total internal reflection occurs, and the image light 455 propagates internally toward the decoupling element 470. For example, the pitch of the diffraction grating may be in the range of 300 nm to 600 nm.

The decoupling element 470 decouples the total internally reflected image light 455 from the source waveguide 430. The decoupling element 70 may be, e.g., a diffraction grating, a holographic grating, a holographic reflector, a set of reflective surfaces embedded into the source waveguide 430, one or more prismatic reflectors, some other element that decouples image light out of the source waveguide 430, or some combination thereof. For example, in embodiments where the decoupling element 470 is a diffraction grating, the pitch of the diffraction grating is chosen to cause incident image light to exit the source waveguide 430. An orientation of the image light exiting from the source waveguide 430 may be altered by varying the orientation of the image light exiting the source assembly 410, varying an orientation of the source assembly 410, or some combination thereof. For example, the pitch of the diffraction grating may be in the range of 300 nm to 600 nm.

The image light 340 existing the source waveguide 430 is expanded at least along one dimension (e.g., may be elongated along x-dimension). The image light 340 couples to an output waveguide 320 as described above with reference to FIG. 3A.

In some embodiments, the decoupling element 470 has an extended length in the direction of propagation of an image light trapped inside the source waveguide 430. The decoupling element 470 may represent an exit pupil of the source waveguide 430. The dimension of the exit pupil may be limited by the optics system 450.

In some configurations, the coupling element 460 and the decoupling element 470 may have the same dimensions in order to capture at least some of the image light 455 coupled in to the source waveguide 430.

The controller 330 controls the source assembly 410 by providing scanning instructions to the source assembly 410. The scanning instructions cause the source assembly 410 to render light such that image light exiting the decoupling element 360 of the output waveguide 320 scans out one or more 2D images. For example, the scanning instructions may cause the source assembly 410 (via adjustments to optical elements in the optics system 450) to scan out an image in accordance with a scan pattern (e.g., raster, interlaced, etc.). The scanning instructions control an intensity of light emitted from the source assembly 410, and the optics system 450 scans out the image by rapidly adjusting orientation of the emitted light. If done fast enough, a human eye integrates the scanned pattern into a single 2D image.

The cross-section 400 of FIG. 4 shows an example with a single source waveguide 430 receiving a monochromatic beam of expanded image light 455 from the source assembly 410. A polychromatic display is discussed below with reference to FIG. 6.

Figure 5A:
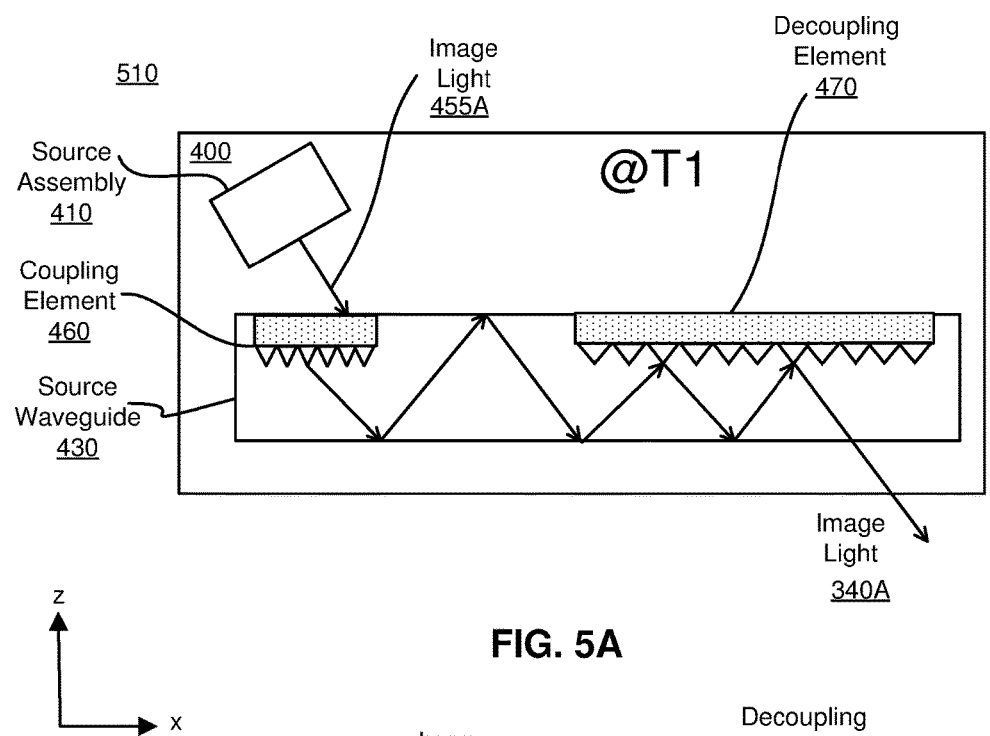
FIG. 5A illustrates a cross-sectional view of the scanning waveguide display emitting image light at a first orientation, in accordance with an embodiment.

FIG. 5A illustrates a cross-sectional view 510 of the scanning waveguide assembly 400 emitting image light at a first orientation, in accordance with an embodiment. In the embodiment of FIG. 5A, the scanning waveguide assembly 400 scans along the Y-dimension and the source waveguide 430 guides the image light 340 along the X-dimension. The source assembly 410, as described above in conjunction with FIG. 4, may be oriented in any given direction in order to change a direction of the expanded image light 540A output from the decoupling element 470 of the source waveguide 430. In alternate embodiments, the source assembly 410 remains stationary, however, the optics system 450 causes the changes in orientation of the image light 455. The source assembly 410 may be oriented at an angle of inclination with respect to the outer surface of the source waveguide 430 to achieve a slanted collimated beam of expanded image light 455A incident on the coupling element 460 at a given instant of time represented as 'T1.' The source assembly 410 receives the scanning instructions from the controller 330, as described in conjunction with FIG. 3A, which determines an orientation of the image light. The image light 455A undergoes total internal reflection inside the source waveguide 430, and outputs as image light 340A via the decoupling element 470. In this embodiment, the image light 340A is expanded in at least one direction (e.g. along x-axis).

Figure 5B:
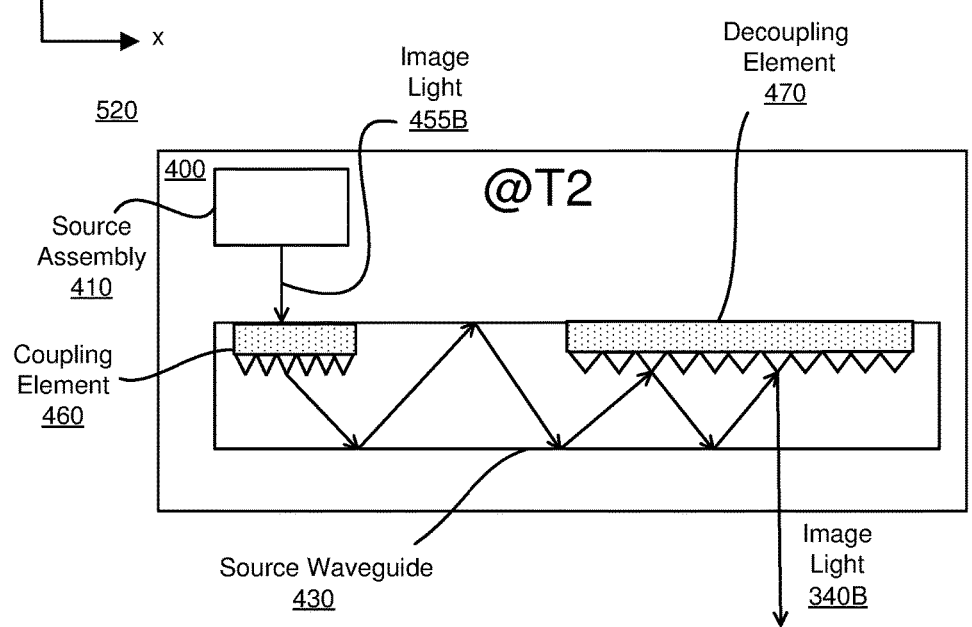
FIG. 5B illustrates a cross-sectional view of the scanning waveguide assembly emitting image light at a second orientation, in accordance with an embodiment.

FIG. 5B illustrates a cross-sectional view 520 of the scanning waveguide assembly 400 emitting image light at a second orientation, in accordance with an embodiment. In the embodiment of FIG. 5B, the scanning waveguide assembly 400 scans along the Y-dimension and the source waveguide 430 guides the image light 340 along the X-dimension. In another instance represented as 'T2,' the scanning instructions cause the source assembly 410 to emit image light 455B at a second orientation. In this case, the second orientation is substantially normal to the coupling element 460. The image light 455B is received at the coupling element 460. The image light 455B undergoes total internal reflection inside the source waveguide 430, and outputs as image light 340B via the decoupling element 470. In this embodiment, the image light 340B is expanded in at least one direction (e.g. along X-axis).

Figure 5C:
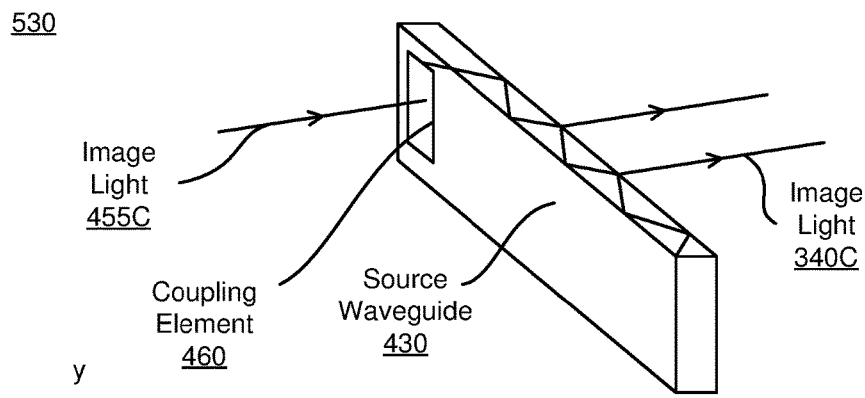
FIG. 5C illustrates a tilted view of a portion of the scanning waveguide assembly emitting image light at a third orientation, in accordance with an embodiment.

FIG. 5C illustrates a tilted view of a portion of the scanning waveguide assembly 400 emitting image light at a third orientation, in accordance with an embodiment. In the embodiment of FIG. 5C, the scanning waveguide assembly 400 scans along the Y-dimension and the source waveguide 430 guides the image light 455C along the X-dimension.

The source waveguide 430 of the scanning waveguide assembly 400 is oriented parallel to the Y-axis without any slanting.

Figure 5D:
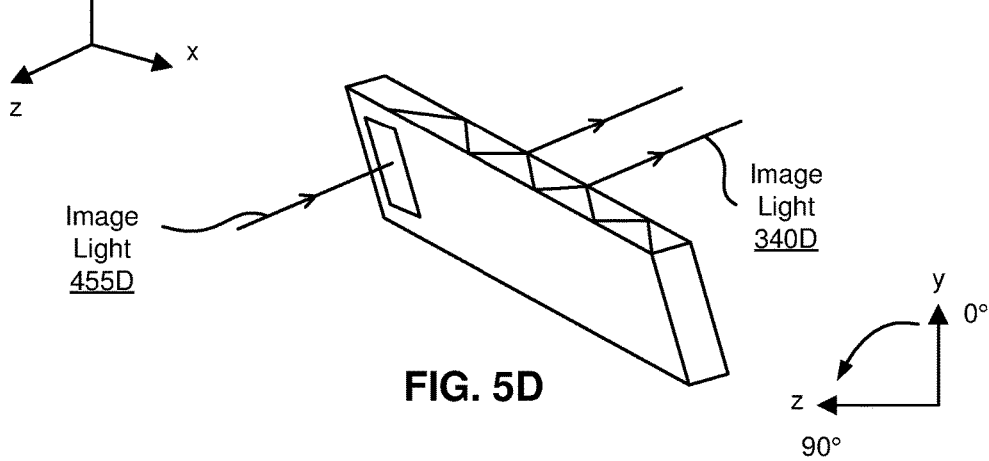
FIG. 5D illustrates a tilted view of a portion of the scanning waveguide assembly emitting image light at a fourth orientation, in accordance with an embodiment.

FIG. 5D illustrates a tilted view of a portion of the scanning waveguide assembly 400 emitting image light at a fourth orientation, in accordance with an embodiment. In the embodiment of FIG. 5D, the scanning waveguide assembly 400 scans along the Y-dimension and the source waveguide 430 guides the image light 455D along the X-dimension. The source waveguide 430 of the scanning waveguide assembly 400 is inclined at a first angle to the Y-axis. For example, the first angle may be in the range of 0 to 90 degrees.

Figure 5E:
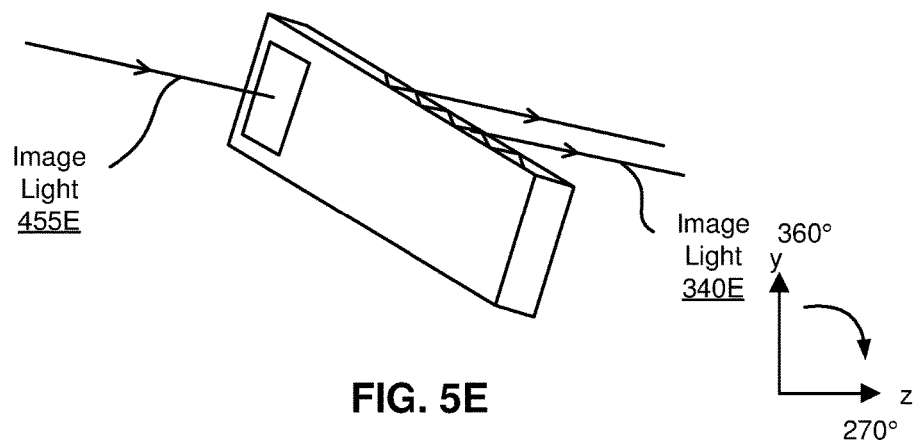
FIG. 5E illustrates a tilted view of a portion of the scanning waveguide assembly emitting image light at a fifth orientation, in accordance with an embodiment.

FIG. 5E illustrates a tilted view of a portion of the scanning waveguide assembly 400 emitting image light at a fifth orientation, in accordance with an embodiment. In the embodiment of FIG. 5E, the scanning waveguide assembly 400 scans along the Y-dimension and the source waveguide 430 guides the image light 455E along the X-dimension. The source waveguide 430 of the scanning waveguide assembly 400 is inclined at a second angle to the Y-axis. For example, the second angle may be in the range of 270 to 360 degrees.

With reference to FIG. 5C-E, the illustration 530 of the orientations of the source waveguide 430 is shown only as different examples of the scanning operation disclosed. The orientation of the source waveguide 430 alters the direction of the image light 340. The image light 455 has the same orientation as the image light 340 in all the examples shown.

In alternate embodiments, the location of the coupling element 460 could be on the opposite side as that of the decoupling element 470. In some configurations, the scanning waveguide assembly 400 may perform a scanning operation of the source 440 inside the source assembly 410 to form a line image. The location of the coupling element shown in FIG. 5 is only an example, and several other arrangements are apparent to one of ordinary skill in the art.

Stacked Waveguide Display

A collimated beam of image light has one or more physical properties, including, but not restricted to, wavelength, luminous intensity, flux, etc. The wavelength of collimated beam of image light from a source assembly (e.g., 410) strongly impacts, among several other parameters, the FOV, as described above in conjunction with FIG. 2, of the NED 100. The FOV would be very small in cases where a source assembly emits image light across an entire visible band of image light. However, the waveguide display 300 has a relatively large FOV as the waveguide display 300 includes a mono-chromatic source in the example shown in FIG. 3A. Accordingly, to generate a polychromatic display that has a large FOV, one or more monochromatic waveguide displays (with one or more image light at different wavelengths) are stacked to generate a single polychromatic stacked waveguide display.

Figure 6:
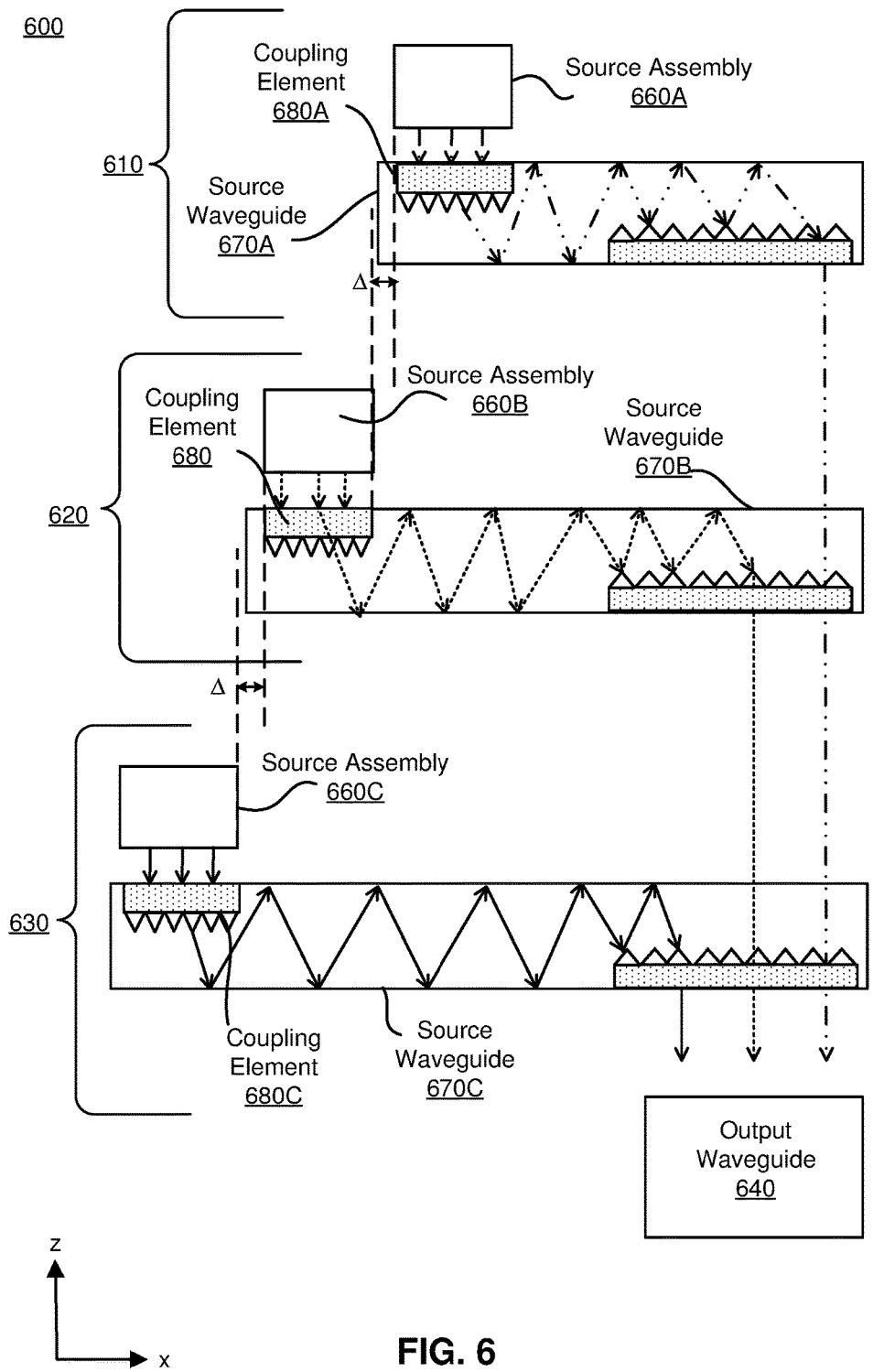
FIG. 6 illustrates a cross-sectional view of a stacked waveguide display, in accordance with an embodiment.

FIG. 6 illustrates a cross-sectional view of a stacked waveguide display 600, in accordance with an embodiment. The stacked waveguide display 600 includes a plurality of scanning waveguide assemblies, and one or more output waveguides. In FIG. 6, the stacked waveguide display 600 includes a scanning waveguide assembly 610, a scanning waveguide assembly 620, and a scanning waveguide assembly 630, and an output waveguide 640. The scanning waveguide assemblies 610, 620, and 630 are substantially the same as the scanning waveguide assembly 400, except that they each are modified to emit image light at a different wavelength. The output waveguide 640 is not drawn to scale and is substantially similar to the output waveguide 320, except designed to handle at least the three different wavelengths of light. FIG. 6 is an example of a stacked waveguide display 600, and several other combinations emitting image lights at different wavelengths are apparent to one of ordinary skill in the art.

In the example shown in FIG. 6, the scanning waveguide assembly 610 emits image light at a wavelength corresponding to first color (e.g., blue), the scanning waveguide assembly 620 emits image light at a wavelength corresponding to second color (e.g., green), and the scanning waveguide assembly 630 emits image light at a wavelength corresponding to third color (e.g., red). The light emitted from the scanning waveguide assembly 620 passes through the scanning waveguide assembly 620 and the scanning waveguide assembly 630. And the light emitted from the scanning waveguide assembly 620 passes through the scanning waveguide assembly 630. Accordingly, the final image light 650 coupling to the output waveguide 640 is polychromatic.

The scanning waveguide assemblies 610, 620, and 630 include a respective source assembly 660A, 660B, and 660C and a respective source waveguide 670A, 670B, and 670C. A spatial separation of 'Δ' is introduced in X between adjacent scanning waveguide assemblies such that any stray light emitted by one scanning waveguide assembly is not coupled into the source waveguide of the adjacent scanning waveguide assembly. Each of the source waveguides 670A, 670B, and 670C include a respective coupling element 680A, 680B, and 680C. The stacked waveguide display 600 is typically used when the coupling element 680 represents a diffractive grating. Stray light incident on a coupling element has a higher chance of being coupled into a waveguide. Accordingly, the separation in X helps ensure, e.g., that light emitted by the scanning waveguide assembly 610 is not coupled into the scanning waveguide assemblies 620 and 630. In contrast, if there was no separation in X (i.e., the source and coupling elements for each waveguide assembly is bisected by a same line in Z), image ghosting may occur.

Varifocal Waveguide Display

Referring back to FIG. 2, the NED 100 displays image light at an exit pupil 230 to an eye 220 without any blurring. The stacked waveguide display 600 of FIG. 6 may still have interferences at the exit pupil 230 but at a smaller scale. One way to reduce the blurring of image light seen by the eye 220 is to introduce changes in a focal position of the waveguide display assembly 210.

Figure 7:
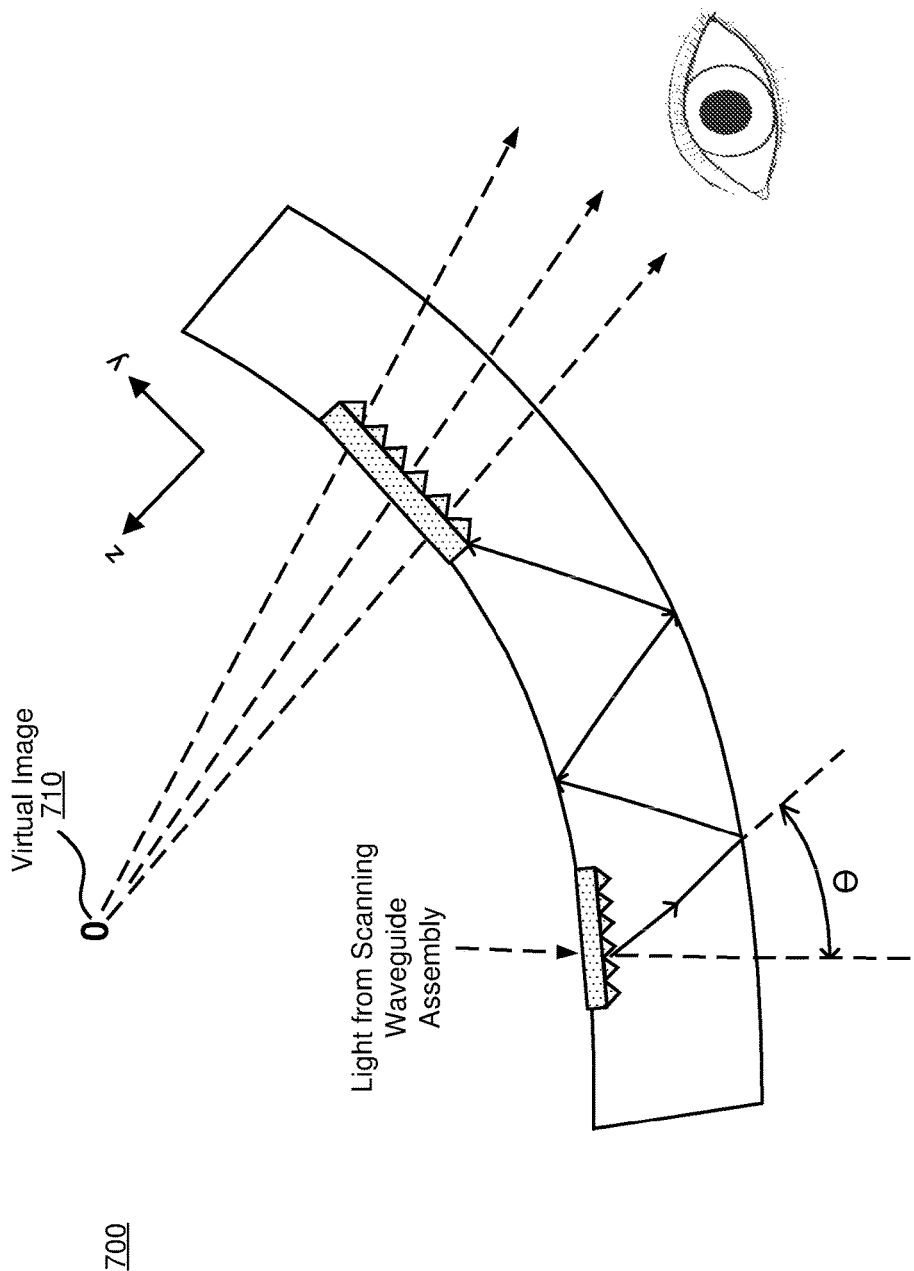
FIG. 7 illustrates a cross-sectional view of an output waveguide of a varifocal waveguide display, in accordance with an embodiment.

FIG. 7 illustrates a cross-sectional view of an output waveguide 700 of a varifocal waveguide display, in accordance with an embodiment. The varifocal waveguide display is substantially the same as the waveguide display 300, except that a source waveguide and/or an output waveguide are deformable by one or more actuators. In some embodiments, the varifocal waveguide display is a component of the NED 100. In alternate embodiments, the varifocal waveguide display is part of some other NED, or other system that directs display image light to a particular location.

The output waveguide 700 is a deformable waveguide. The output waveguide 700 is coupled to one or more actuators (not shown). The one or more actuators cause the output waveguide 700 to bend in accordance with scanning instructions, thereby generating curvature in the output waveguide 700. The curvature adjusts a focal position, in one dimension, of image light. The amount of curvature introduced by the one or more actuators is controlled by a controller (e.g., controller 330). The curvature causes the emitted image light to converge (or diverge) in one dimension (e.g., similar to a cylindrical lens). For example, assuming a Cartesian coordinate system, the curvature may be such that as the image light propagates along Z, converges in Y, but not X. Accordingly, the actuators are able to vary a first focal dimension (i.e., a single dimension is focused) of source waveguide. The controller determines an amount of actuation to occur based on a desired focus position for the first focal dimension. In FIG. 7, the introduced curvature is such that a virtual image 710 is generated.

Figure 8:
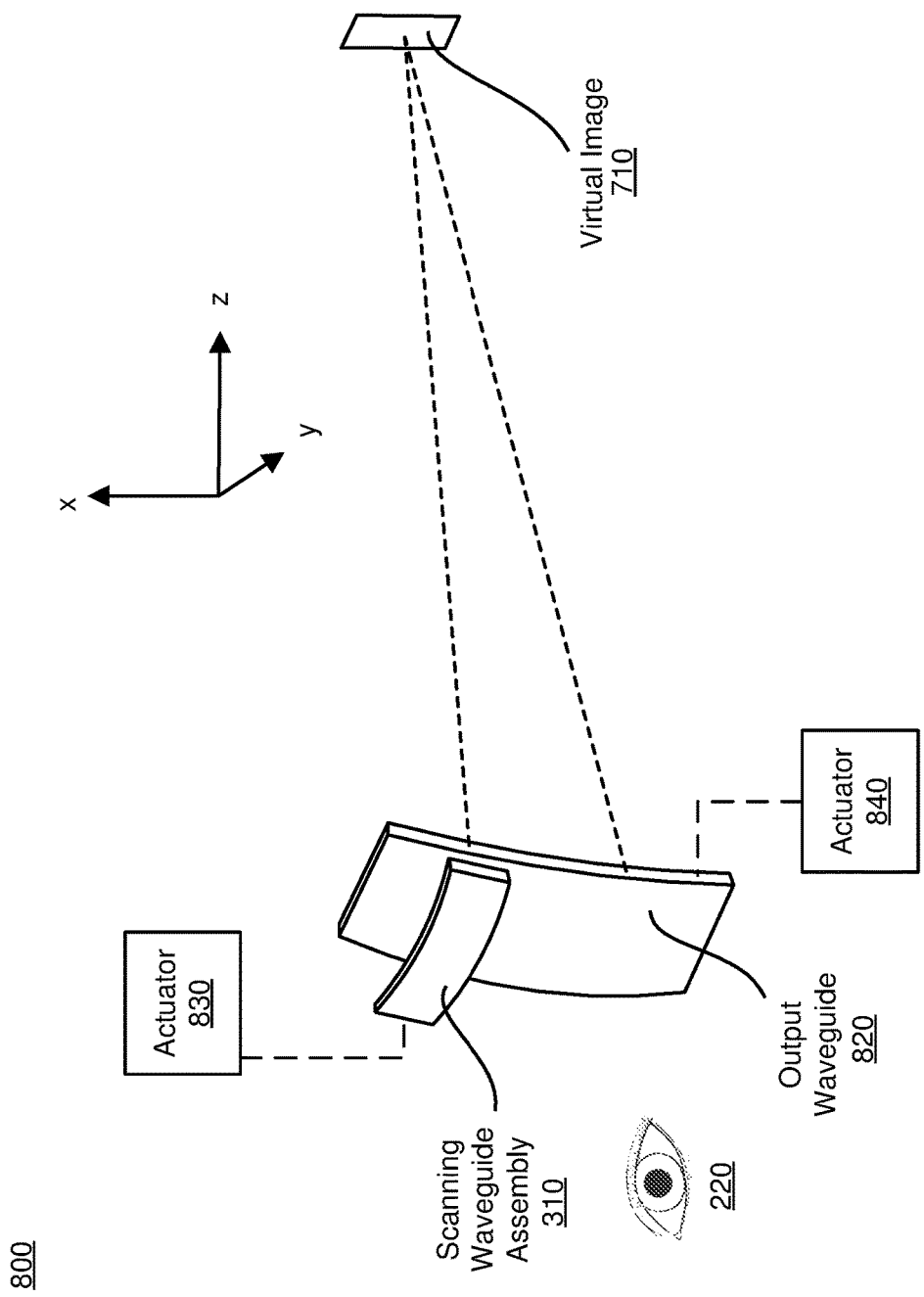
FIG. 8 illustrates a portion of a varifocal waveguide display, in accordance with an embodiment.

FIG. 8 illustrates a portion 800 of a varifocal waveguide display, in accordance with an embodiment. The portion 800 of the varifocal waveguide display illustrated in FIG. 8 includes a source waveguide 810, an output waveguide 820, actuators 830, and actuators 840. The output waveguide 820 is substantially the same as the output waveguide 700 discussed above with reference to FIG. 7. In some embodiments, the varifocal waveguide display is a component of the NED 100. In alternate embodiments, the varifocal waveguide display is part of some other NED, or other system that directs display image light to a particular location. The variable waveguide display uses one or more actuators 830 coupled to the source waveguide 810 and one or more actuators 840 coupled to the output waveguide 820 to introduce curvature into one or both waveguides, to adjust a focal position of image light.

The actuators 830 are able to vary a focal dimension (i.e., a single dimension is focused) of the source waveguide 810. The actuators 840 are able to vary a focal dimension (i.e., a single dimension is focused) of the output waveguide 820, and in some instances, this focal dimension may be orthogonal to (or different from) the first focal dimension. Accordingly, a controller (e.g., controller 330) is able to vary a focus position of the varifocal waveguide display, by adjusting curvature of the source waveguide 810 such that image light focuses at a desired location in a first focal dimension, and adjusting curvature of the output waveguide 820 such that the image light also focuses at the desired location in a second focal dimension that is orthogonal to the first focal dimension. In some embodiments, the actuators 830 and 840 may be based on one or more piezoelectric motors that receive controlling instructions from the controller 330.

Additionally, in alternate embodiments, the varifocal waveguide display may be modified to be a stacked display as well as a varifocal display. For example, a plurality of scanning waveguide assemblies may be stacked to produce polychromatic image light that is coupled to the output waveguide 820. Additionally, each of the stacked scanning waveguide assemblies may be coupled to one or more actuators to introduce curvature into their respective waveguides in accordance with scanning instructions from a controller.

Figure 9:
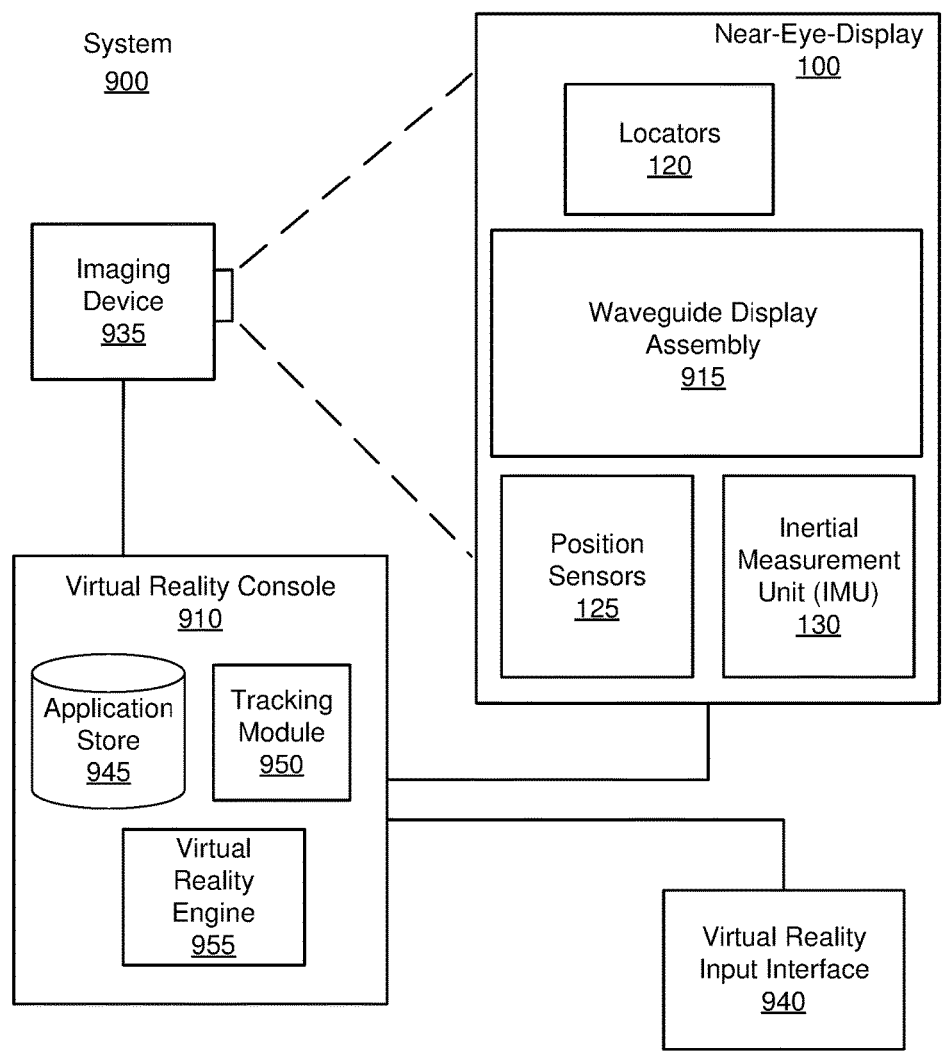
FIG. 9 is a block diagram of a system including the NED, according to an embodiment.

FIG. 9 is a block diagram of a system 900 including the NED 100, according to an embodiment. The system 900 shown by FIG. 9 comprises the NED 100, an imaging device 935, and a VR input interface 940 that are each coupled to the VR console 910.

While FIG. 9 shows an example system 900 including one NED 100, one imaging device 935, and one VR input interface 940, in other embodiments, any number of these components may be included in the system 900. For example, there may be multiple NEDs 100 each having an associated VR input interface 940 and being monitored by one or more imaging devices 935, with each NED 100, VR input interface 940, and imaging devices 935 communicating with the VR console 910. In alternative configurations, different and/or additional components may be included in the system 900. Similarly, functionality of one or more of the components can be distributed among the components in a different manner than is described here. For example, some or all of the functionality of the VR console 910 may be contained within the NED 100. Additionally, in some embodiments the VR system 900 may be modified to include other system environments, such as an AR system environment.

The NED 100 is a near-eye display that presents media to a user. Examples of media presented by the NED 100 include one or more images, video, audio, or some combination thereof. In some embodiments, audio is presented via an external device (e.g., speakers and/or headphones) that receives audio information from the NED 100, the VR console 910, or both, and presents audio data based on the audio information. In some embodiments, the NED 100 may also act as an AR eye-wear glass. In these embodiments, the NED 100 augments views of a physical, real-world environment with computer-generated elements (e.g., images, video, sound, etc.).

The NED 100 includes a waveguide display assembly 915, one or more locators 120, one or more position sensors 125, and the inertial measurement unit (IMU) 130. The waveguide display assembly 915 includes at least the scanning waveguide assembly 310, the output waveguide 320, and the controller 330. Details for various embodiments of the waveguide display element are discussed in detail with reference to FIGS. 3A and 4. The waveguide display assembly includes, e.g., a waveguide display, a stacked waveguide display, a varifocal waveguide display, or some combination thereof.

The locators 120 are objects located in specific positions on the NED 100 relative to one another and relative to a specific reference point on the NED 100. A locator 120 may be a light emitting diode (LED), a corner cube reflector, a reflective marker, a type of light source that contrasts with an environment in which the NED 100 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), in some other portion of the electromagnetic spectrum, or in some combination thereof.

In some embodiments, the locators 120 are located beneath an outer surface of the NED 100, which is transparent to the wavelengths of light emitted or reflected by the locators 120 or is thin enough to not substantially attenuate the wavelengths of light emitted or reflected by the locators 120. Additionally, in some embodiments, the outer surface or other portions of the NED 100 are opaque in the visible band of wavelengths of light. Thus, the locators 120 may emit light in the IR band under an outer surface that is transparent in the IR band but opaque in the visible band.

As illustrated in FIG. 1, the locators 120 are located in fixed positions on the frame 105 relative to one another and relative to a reference point 115. In the example of FIG. 1, the reference point 115 is located at the center of the IMU 130. Each of the locators 120 emits light that is detectable by an imaging device (e.g., camera). Locators 120, or portions of locators 120, are located on a front side 120A, a top side 120B, a bottom side 120C, a right side 120D, and a left side 120E of the frame 105 in the example of FIG. 1.

The IMU 130 is an electronic device that generates fast calibration data indicating an estimated position of the NED 100 relative to an initial position of the NED 100 based on measurement signals received from one or more of the position sensors 125. A position sensor 125 generates one or more measurement signals in response to motion of the NED 100. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof. In the embodiment shown by FIG. 9, the position sensors 125 are located within the IMU 130, and neither the IMU 130 nor the position sensors 125 are visible to the user (e.g., located beneath an outer surface of the NED 100).

Based on the one or more measurement signals generated by the one or more position sensors 125, the IMU 130 generates fast calibration data indicating an estimated position of the NED 100 relative to an initial position of the NED 100. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals from various position sensors 125 and calculates the estimated position of the NED 100 from the sampled data. For example, the IMU 130 integrates the measurement signals received from one or more accelerometers over time to estimate a velocity vector and integrates the velocity vector over time to determine an estimated position of a reference point on the NED 100. The reference point is a point that may be used to describe the position of the NED 100. While the reference point may generally be defined as a point in space; however, in practice, the reference point is defined as a point within the NED 100 (e.g., the reference point 115 representing a center of the IMU 130).

The imaging device 935 generates slow calibration data in accordance with calibration parameters received from the VR console 910. Slow calibration data includes one or more images showing observed positions of the locators 120, discussed in detail with reference to FIG. 1 above, which are detectable by the imaging device 935. The imaging device 935 may include one or more cameras, one or more video cameras, any other device capable of capturing images including one or more of the locators 120, or some combination thereof. Additionally, the imaging device 935 may include one or more filters (e.g., used to increase signal to noise ratio). The imaging device 935 is configured to detect image light emitted or reflected from locators 120 in the FOV of the imaging device 935. In embodiments where the locators 120 include passive elements (e.g., a retroreflector), the imaging device 935 may include an image light source that illuminates some or all of the locators 120, which retro-reflect the image light towards the image light source in the imaging device 935. Slow calibration data is communicated from the imaging device 935 to the VR console 910, and the imaging device 935 receives one or more calibration parameters from the VR console 910 to adjust one or more imaging parameters (e.g., focal length, focus, frame rate, ISO, sensor temperature, shutter speed, aperture, etc.).

The VR input interface 940 is a device that allows a user to send action requests to the VR console 910. An action request is a request to perform a particular action. For example, an action request may be to start or end an application or to perform a particular action within the application. The VR input interface 940 may include one or more input devices. Example input devices include: a keyboard, a mouse, a game controller, or any other suitable device for receiving action requests and communicating the received action requests to the VR console 910. An action request received by the VR input interface 940 is communicated to the VR console 910, which performs an action corresponding to the action request. In some embodiments, the VR input interface 940 may provide haptic feedback to the user in accordance with instructions received from the VR console 910. For example, haptic feedback is provided when an action request is received, or the VR console 910 communicates instructions to the VR input interface 940 causing the VR input interface 940 to generate haptic feedback when the VR console 910 performs an action.

The VR console 910 provides media to the NED 100 for presentation to the user in accordance with information received from one or more of: the imaging device 935, the NED 100, and the VR input interface 940. In the example shown in FIG. 9, the VR console 910 includes an application store 945, a tracking module 950, and a VR engine 955. Some embodiments of the VR console 910 have different modules than those described in conjunction with FIG. 9. Similarly, the functions further described below may be distributed among components of the VR console 910 in a different manner than is described here.

The application store 945 stores one or more applications for execution by the VR console 910. An application is a group of instructions, that when executed by a processor, generates content for presentation to the user. Content generated by an application may be in response to inputs received from the user via movement of the NED 100 or the VR interface device 940. Examples of applications include: gaming applications, conferencing applications, video playback application, or other suitable applications.

The tracking module 950 calibrates the VR system 900 using one or more calibration parameters and may adjust one or more calibration parameters to reduce error in determination of the position of the NED 100. For example, the tracking module 950 adjusts the focus of the imaging device 935 to obtain a more accurate position for observed locators on the NED 100. Moreover, calibration performed by the tracking module 950 also accounts for information received from the IMU 930. Additionally, if tracking of the NED 100 is lost (e.g., the imaging device 935 loses line of sight of at least a threshold number of the locators 920), the tracking module 950 re-calibrates some or the entire system 900.

The tracking module 950 tracks movements of the NED 100 using slow calibration information from the imaging device 935. As further described in conjunction with FIG. 1, the tracking module 150 determines positions of a reference point of the NED 100 using observed locators from the slow calibration information and a model of the NED 100. The tracking module 950 also determines positions of a reference point of the NED 100 using position information from the fast calibration information. Additionally, in some embodiments, the tracking module 950 may use portions of the fast calibration information, the slow calibration information, or some combination thereof, to predict a future location of the NED 100. The tracking module 950 provides the estimated or predicted future position of the NED 100 to the VR engine 955.

The VR engine 955 executes applications within the system 900 and receives position information, acceleration information, velocity information, predicted future positions, or some combination thereof of the NED 100 from the tracking module 950. In some embodiments, the information received by the VR engine 955 may be used for producing a signal (e.g., display instructions) to the waveguide display assembly 915 that determines the type of content presented to the user. For example, if the received information indicates that the user has looked to the left, the VR engine 955 generates content for the NED 100 that mirrors the user's movement in a virtual environment by determining the type of source and the waveguide that must operate in the waveguide display assembly 915. For example, the VR engine 955 may produce a display instruction that would cause the waveguide display assembly 915 to generate content with red, green, and blue color. Additionally, the VR engine 955 performs an action within an application executing on the VR console 910 in response to an action request received from the VR input interface 940 and provides feedback to the user that the action was performed. The provided feedback may be visual or audible feedback via the NED 100 or haptic feedback via the VR input interface 940.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in image light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the disclosed subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure.

What is claimed is:

1. A waveguide display, comprising:
    a light source configured to emit image light in accordance with scanning instructions;
    a first source waveguide including a first entrance area and a first exit area, the first source waveguide configured to receive the image light from the light source at the entrance area, expand the image light in at least one dimension, and output a first expanded image light from the first exit area, a first curvature of the first source waveguide being adjustable;
    an output waveguide including an input area and an output area, the output waveguide positioned to receive the first expanded image light emitted from the first source waveguide at the input area, and output the first expanded image light from the output area, a second curvature of the output waveguide being adjustable and orthogonal to the first curvature;
    an actuator assembly including a first set of actuators and a second set of actuators and configured to adjust the first curvature of the first source waveguide and the second curvature of the second source waveguide, the first set of actuators configured to adjust the first curvature of the first source waveguide and the second set of actuators configured to adjust the second curvature of the second source waveguide; and
    a controller configured to generate the scanning instructions and provide the scanning instructions to the light source and the actuator assembly.

2. The waveguide display of claim 1, wherein the output waveguide outputs the expanded image light for a portion of the output area, and a location of the portion of the output area based in part on a direction of the expanded light output from the first source waveguide.

3. The waveguide display of claim 1, wherein the first curvature of the first source waveguide and the second curvature of the output waveguide determine a focal position of the expanded image light.

4. The waveguide display of claim 3, wherein the actuator assembly adjusts the first curvature and the second curvature based on the scanning instructions.

5. The waveguide display of claim 1, wherein at least one of the first source waveguide and the output waveguide is a deformable waveguide coupled to the actuator assembly.

6. The waveguide display of claim 1, wherein the light source emits image light within a first band of light, and the scanning waveguide further comprises:
    a second light source that emits second image light within a second band of light that is different from the first band of light; and
    a second source waveguide including a second entrance area and a second exit area, the second source waveguide configured to receive the second image light from the light source at the entrance area, expand the second image light in at least one dimension, and output an expanded second image light from the second exit area, and
    wherein the output waveguide is positioned to receive the second expanded image light at the input area, and output the second expanded image light combined with the first expanded image light from the output area as a polychromatic image.

7. The waveguide display of claim 6, wherein a first distance between the first entrance area and the first exit area is greater than a second distance between the second entrance area and the second exit area, and the second expanded image light is transmitted through the second exit area before being received by the output waveguide.

8. The waveguide display of claim 6, wherein the first band of light and the second band of light are in a visible band.

9. The waveguide display of claim 1, wherein the first entrance area and the first exit area of the first source waveguide, and the output area and the input area of the output waveguide are selected from a group consisting of: a diffraction grating, a holographic diffraction grating, a holographic reflector, a set of reflective surfaces, and one or more prismatic reflectors.

10. The waveguide display of claim 1, wherein the first source waveguide includes a top surface and a bottom surface that is opposite the top surface, and the first entrance area is located along the top surface and the first exit area is located along the bottom surface.

11. The waveguide display of claim 1, wherein the first source waveguide includes a planar surface, and the first entrance area and the first exit area are both located along the planar surface.

12. A near-eye display (NED), comprising:
a frame configured to worn by a user;
a waveguide display that is integrated into the display, the waveguide display comprising:
a light source configured to emit image light in accordance with scanning instructions;
a first source waveguide including a first entrance area and a first exit area, the first source waveguide configured to receive the image light from the light source at the first entrance area, expand the image light in at least one dimension, and output a first expanded image light from the first exit area, a first curvature of the first source waveguide being adjustable;
an output waveguide including an input area and an output area, the output waveguide positioned to receive the first expanded image light emitted from the first source waveguide at the input area, and output the first expanded image light from the output area, a second curvature of the output waveguide being adjustable and orthogonal to the first curvature;
an actuator assembly including a first set of actuators and a second set of actuators and configured to adjust the first curvature and the second curvature, the first set of actuators configured to adjust the first curvature of the first source waveguide and the second set of actuators configured to adjust the second curvature of the second source waveguide; and a controller configured to generate the scanning instructions and provide the scanning instructions to the light source and the actuator assembly.

13. The NED of claim 12, wherein the output waveguide outputs the expanded image light for a portion of the output area, and a location of the portion of the output area based in part on a direction of the expanded light output from the first source waveguide.

14. The NED of claim 12, wherein the first curvature of the first source waveguide and the second curvature of the output waveguide determine a focal position of the expanded image light.

15. The NED of claim 14, wherein the actuator assembly adjusts the first curvature and the second curvature based on the scanning instructions.

16. The NED of claim 12, wherein at least one of the first source waveguide and the output waveguide is a deformable waveguide coupled to the actuator assembly.

17. The NED of claim 12, wherein the light source emits image light within a first band of light, and the scanning waveguide further comprises:
a second light source that emits second image light within a second band of light that is different from the first band of light; and
a second source waveguide including a second entrance area and a second exit area, the second source waveguide configured to receive the second image light from the light source at the entrance area, expand the second image light in at least one dimension, and output an expanded second image light from the second exit area, and
wherein the output waveguide, the output waveguide positioned to receive the second expanded image light at the input area, and output the second expanded image light combined with the first expanded image light from the output area as a polychromatic image.

18. The NED of claim 17, wherein a first distance between the first entrance area and the first exit area is greater than a second distance between the second entrance area and the second exit area, and the second expanded image light is transmitted through the second exit area before being received by the output waveguide.

19. The NED of claim 12, wherein the first source waveguide includes a top surface and a bottom surface that is opposite the top surface, and the first entrance area is located along the top surface and the first exit area is located along the bottom surface.

20. The NED of claim 12, wherein the first source waveguide includes a planar surface, and the first entrance area and the first exit area are both located along the planar surface.

* * * * *

UNITED STATES PATENT AND TRADEMARK OFFICE
CERTIFICATE OF CORRECTION

PATENT NO. : 10,228,565 B1
APPLICATION NO. : 15/495373
DATED : March 12, 2019
INVENTOR(S) : Pasi Saarikko It is certified that error appears in the above-identified patent and that said Letters Patent is hereby corrected as shown below:

In the Claims

Column 17, Line 26, Claim 12, after "to" insert -- be --.

Signed and Sealed this
Twenty-ninth Day of October, 2019

Andrei Iancu
*Director of the United States Patent and Trademark Office*